(12) United States Patent
Kim et al.

(10) Patent No.: US 8,498,251 B2
(45) Date of Patent: Jul. 30, 2013

(54) METHOD FOR GENERATING/ALLOCATING TEMPORARY ADDRESS IN WIRELESS BROADBAND ACCESS NETWORK AND METHOD FOR ALLOCATING RADIO RESOURCE BASED ON THE SAME

(75) Inventors: Sang-Eon Kim, Seoul (KR); Seong-Choon Lee, Seoul (KR); Jong-Sam Jin, Seoul (KR); Min-Kon Kwag, Seoul (KR); Se-Jin Park, Seoul (KR)

(73) Assignee: KT Corporation, Gyeonggi-do (KR)

( * ) Notice: Subject to any disclaimer, the term of this patent is extended or adjusted under 35 U.S.C. 154(b) by 899 days.

(21) Appl. No.: 12/524,980

(22) PCT Filed: Jan. 30, 2007

(86) PCT No.: PCT/KR2007/000511
§ 371 (c)(1),
(2), (4) Date: Jul. 29, 2009

(87) PCT Pub. No.: WO2008/093900
PCT Pub. Date: Aug. 7, 2008

(65) Prior Publication Data
US 2010/0046452 A1    Feb. 25, 2010

(30) Foreign Application Priority Data
Jan. 29, 2007   (KR) .................. 10-2007-0008913

(51) Int. Cl.
*H04W 4/00* (2009.01)
*H04W 74/00* (2009.01)
(52) U.S. Cl.
USPC ..................... 370/329; 370/328; 455/450

(58) Field of Classification Search
USPC ............................................. 370/329
See application file for complete search history.

(56) References Cited

U.S. PATENT DOCUMENTS

| 6,115,545 | A  |   | 9/2000  | Mellquist |
| 6,771,635 | B1 |   | 8/2004  | Vilander et al. |
| 2002/0167922 | A1 |   | 11/2002 | Inoue et al. |
| 2003/0212892 | A1 | * | 11/2003 | Oishi ..................... 713/168 |

(Continued)

FOREIGN PATENT DOCUMENTS

| KR | 1020030039348 A | 5/2003 |
| KR | 1020050057830 A | 6/2005 |
| KR | 1020060130352 A | 12/2006 |
| KR | 1020070006151 A | 1/2007 |

OTHER PUBLICATIONS

Yongseok Lee et al., "Flow-based Internet Traffic Measurement and Analysis", Proceedings of KIISE Fall Conference 1998, Oct. 1, 1998, pp. 515-517.

*Primary Examiner* — Shripal Khajuria
(74) *Attorney, Agent, or Firm* — IP Legal Services, LLC

(57) ABSTRACT

Provided a method for generating/allocating a temporary address in a wireless broadband access network, a method for allocating radio resource based on the same, and a computer-readable recording medium recording a program for realizing the methods. The method for generating the temporary address in the wireless broadband access network, includes the steps of: receiving a router advertisement message in a portable subscriber station; acquiring service flow identification (ID) based on a temporary address allocation guidance parameter of the router advertisement message in the portable subscriber station; and generating a wireless broadband Internet (WiMAX/Mobile WiMAX) temporary address based on the service flow ID in the portable subscriber station.

13 Claims, 5 Drawing Sheets

U.S. PATENT DOCUMENTS

2003/0236887 A1* 12/2003 Kesselman et al. ........... 709/226
2004/0258005 A1* 12/2004 Kitawaki ...................... 370/254
2005/0078824 A1* 4/2005 Malinen et al. ................ 380/247
2006/0046713 A1* 3/2006 Yokota et al. ............... 455/426.1

* cited by examiner

METHOD FOR GENERATING/ALLOCATING TEMPORARY ADDRESS IN WIRELESS BROADBAND ACCESS NETWORK AND METHOD FOR ALLOCATING RADIO RESOURCE BASED ON THE SAME

This application is a national stage application of PCT/KR2007/000511 filed on Jan. 30, 2007, which claims priority of Korean patent application number 10-2007-0008913 filed on Jan. 29, 2007. The disclosure of each of the foregoing applications is incorporated herein by reference in its entirety.

TECHNICAL FIELD

The present invention relates to a method for generating/allocating a temporary address in a wireless broadband access network, a method for allocating radio resource based on the same, and a computer-readable recording medium recording a program for realizing the methods; and, more particularly, to a method for generating/allocating a temporary address Internet Protocol version 6 (IPv6) in a wireless broadband access network and allocating radio resource by classifying traffic based on the same, and a computer-readable recording medium recording a program for realizing the methods.

BACKGROUND ART

In the present invention, a flow is defined as consecutive Internet Protocol (IP) packets. That is, in IP packets transmitted from a specific transmitter, i.e., a source, to a receiver, i.e., a destination, a set of specific packets, which are classified by the source, can be defined as the flow.

A service flow identification (SFID) is allocated to all existing service flows. The SFID is operated as a portable subscriber station for a service flow and a basic classifier of a Radio Access Station (RAS). Therefore, the existing service flow has a direction for classifying up/down link with at least one SFID.

A WiMAX/Mobile WiMAX portable subscriber station loading an Internet Protocol version 6 (IPv6) technology should use a unique address in the world.

Generally, IPv6 address information is formed of 128 bits and is set up in a network interface of the portable subscriber station. The IPv6 address information includes prefix information for identifying a network and interface ID for identifying a portable subscriber station in a network.

A conventional IPv6 address setting method is a method for generating interface ID using a predetermined number in the portable subscriber station and generating a temporary address using a prefix value included in a router advertisement message transmitted from an access control station (ACR).

The conventional method has a problem in consideration of IPv6 in a wireless broadband access network.

Since the IPv6 temporary address is a predetermined value, the access control station does not know the temporary address of the portable subscriber station when the address is allocated to the portable subscriber station. Only when a classification rule on the portable subscriber station address is set up in a system in case of the wireless broadband access network, radio resource can be allocated to traffic using the temporary address. However, since the system does not know the allocated temporary address, it is difficult to generate a classification rule on the temporary address.

Also, when the traffic is classified, the method sets up a classification rule on the radio resource allocation based on 5-tuple, where the 5-tuple includes a destination address, a destination port, a source address, a source port, and a protocol. Therefore, applying the classification rule takes a long time and is complicated.

In consideration of the problems, a method for efficiently allocating radio resource by setting up an address, i.e., a temporary address, according to a characteristic of the wireless broadband access network and classifying traffic based on the address, is essentially required.

DISCLOSURE

Technical Problem

A first object of the present invention is to provide a method for generating/allocating an Internet Protocol version 6 (IPv6) temporary address according to a characteristic of a wireless broadband access network and a computer-readable recording medium recording a program for realizing the method.

A second object of the present invention is to provide a method for efficiently allocating radio resource by classifying traffic based on an IPv6 temporary address and a computer-readable recording medium recording a program for realizing the method.

A third object of the present invention is to provide a method for generating a WiMAX/Mobile WiMAX temporary address by transferring a service flow identification (ID) to a portable subscriber station to generate the IPv6 temporary address.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solutiion

To achieve a first object of the present invention, there is provided a method for generating a temporary address in a wireless broadband access network, including the steps of: receiving a router advertisement message in a portable subscriber station; acquiring a service flow identification (ID) based on a temporary address allocation guidance parameter of the router advertisement message in the portable subscriber station; and generating a wireless broadband Internet (WiMAX/Mobile WiMAX) temporary address based on the service flow ID in the portable subscriber station.

The method further includes the step of: transmitting a random key used in generating the WiMAX/Mobile WiMAX temporary address from the portable subscriber station to a radio access station (RAS) through a neighbor solicitation (NS) message.

In accordance with another aspect of the present invention, there is provided a method for allocating a temporary address in a wireless broadband access network, including the steps of: inserting a temporary address allocation guidance parameter to a router advertisement message and transmitting the router advertisement message to a portable subscriber station in the radio access station; and transmitting a service flow identification (ID) to the portable subscriber station in the radio access station upon request of the portable subscriber station based on the temporary address allocation guidance parameter and generating a WiMAX/Mobile WiMAX temporary address based on the service flow ID in the portable subscriber station.

The method further includes the steps of: comparing the managed random key with the random key loaded in the received traffic destination address upon receiving an uplink/downlink traffic in the radio access station, and checking whether the received traffic destination address is the generated IPv6 temporary address; and when the received traffic destination address is the generated IPv6 temporary address, classifying the received uplink/downlink traffic based on the service flow ID of the destination address and allocating radio resource in the radio access station.

In accordance with another aspect of the present invention, there is provided a method for allocating a temporary address in a wireless broadband access network, including the steps of: inserting a temporary address allocation guidance parameter to a router advertisement message and transmitting the router advertisement message to a portable subscriber station in the radio access station; transmitting a service flow identification (ID) to the portable subscriber station in the radio access station upon request of the portable subscriber station based on the temporary address allocation guidance parameter; and generating a WiMAX/Mobile WiMAX temporary address based on the service flow ID in the portable subscriber station.

In accordance with another aspect for achieving the first object of the present invention, there is provided a computer-readable recording medium recording a program for generating a WiMAX/Mobile WiMAX temporary address in a portable subscriber station having a processor, the method including the steps of: receiving a router advertisement message; acquiring service flow identification (ID) based on a temporary address allocation guidance parameter of the router advertisement message; and generating a WiMAX/Mobile WiMAX temporary address based on the service flow ID in the portable subscriber station.

In accordance with another aspect of the present invention, there is provided a computer-readable recording medium recording a program for allocating a WiMAX/Mobile WiMAX temporary address in a radio access station having a processor, the method including the steps of: inserting a temporary address allocation guidance parameter to a router advertisement message and transmitting the router advertisement message to a portable subscriber station; and transmitting a service flow identification (ID) to the portable subscriber station upon request of the portable subscriber station based on the temporary address allocation guidance parameter such that the portable subscriber station generate a WiMAX/Mobile WiMAX temporary address based on the service flow ID.

To achieve the second object of the present invention, there is provided a method for allocating radio resource in a wireless broadband access network, including the steps of: mapping and managing a service flow identification (ID) transmitted to a portable subscriber station to generate a WiMAX/Mobile WiMAX temporary address and a random key used in generating the WiMAX/Mobile WiMAX temporary address in the radio access station; comparing the managed random key with a random key loaded in a received traffic destination address upon receiving an uplink/downlink traffic in the radio access station, and checking whether the received traffic destination address is the generated WiMAX/Mobile WiMAX temporary address; and when the received traffic destination address is the generated WiMAX/Mobile WiMAX temporary address, classifying the received uplink/downlink traffic based on the service flow ID of the destination address and allocating radio resource in the radio access station.

In accordance with another aspect of the present invention, there is provided a computer-readable recording medium recording a program for allocating radio resource in a radio access station having a processor, the method including the steps of: mapping and managing a service flow identification (ID) transmitted to a portable subscriber station to generate a WiMAX/Mobile WiMAX temporary address and a random key used in generating the WiMAX/Mobile WiMAX temporary address; comparing the managed random key with a random key loaded in a received traffic destination address upon receiving an uplink/downlink traffic, and checking whether the received traffic destination address is the generated WiMAX/Mobile WiMAX temporary address; and when the received traffic destination address is the generated WiMAX/Mobile WiMAX temporary address, classifying the received uplink/downlink traffic based on the service flow ID of the destination address and allocating radio resource in the radio access station.

To achieve the third object of the present invention, there is provided a message structure for generating/allocating a temporary address in a wireless broadband access network, wherein the radio access station inserts the temporary address allocation guidance parameter to the router advertisement message and transmits the router advertisement message to the portable subscriber station, where the temporary address allocation guidance parameter is loaded in a W flag, which is a flag of the router advertisement message, and guides that the portable subscriber station acquires the service flow ID from the radio access station through a Dynamic Host Configuration Protocol (DHCP) information request/reply message.

Advantageous Effects

As described above, the present invention can efficiently classify Internet Protocol version 6 (IPv6) traffic by overcoming inefficiency of a conventional traffic classification method, be selectively used in an application program by using an IPv6 temporary address, and secure privacy by including a random value according to an original purpose.

Therefore, the present invention can quickly classify traffic without changing a conventional environment and provide a high quality service in a wireless broadband access network.

Also, the present invention can improve efficiency of radio resource allocation by minimizing a traffic classifying procedure in a wireless broadband access network, and can prevent that the traffic delays due to inefficiency of the classifying procedure. This invention has an advantage that a service quality can be maintained between ends in connection with a conventional network.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
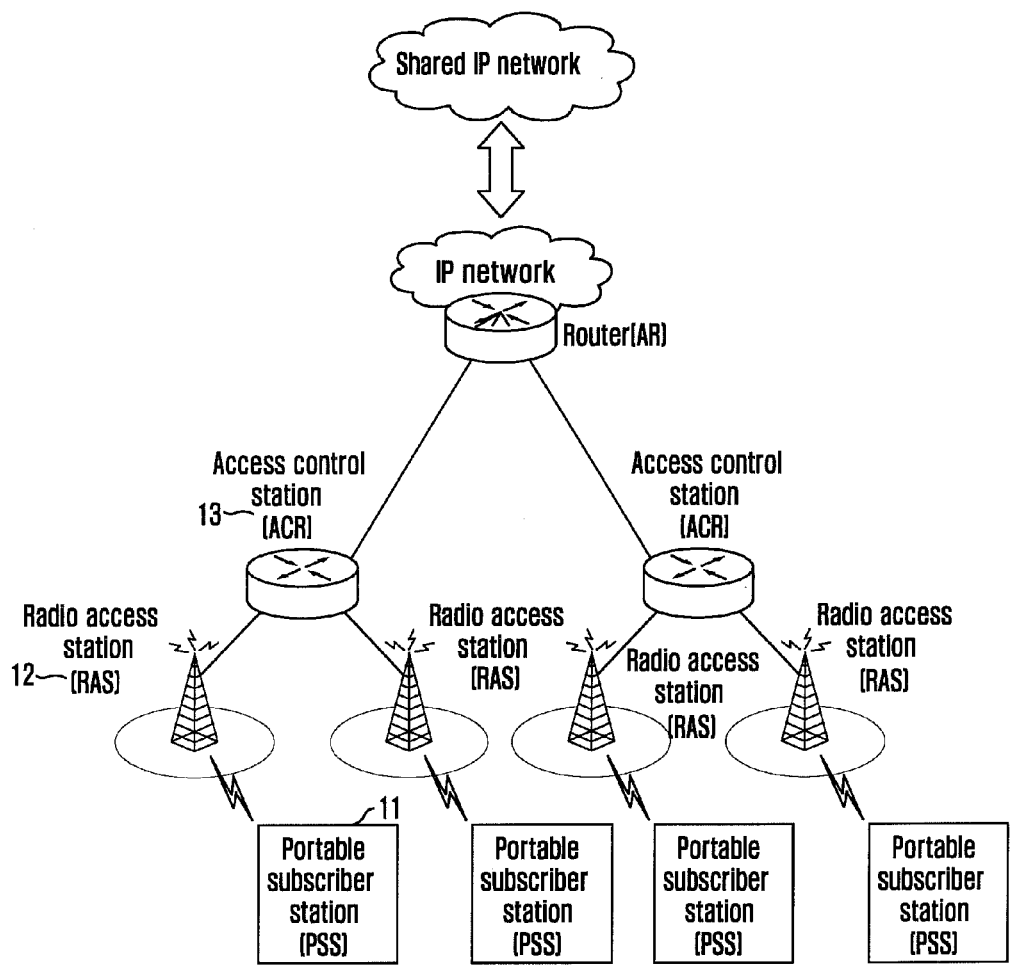
FIG. 1 shows a wireless broadband Internet (WiMAX/Mobile WiMAX) network to which the present invention is applied.

FIG. 1 shows a wireless broadband Internet (WiMAX/Mobile WiMAX) network to which the present invention is applied.

Referring to FIG. 1, a typical WiMAX/Mobile WiMAX network includes a portable subscriber station (PSS) 11 for providing a service through a wireless access to a radio access station (RAS) 12, the radio access station 12 for connecting the wireless network with the portable subscriber station 11 to an Internet Protocol (IP) network, and an access control router (ACR) 13 for IP access and mobility management.

When a packet is transmitted to the portable subscriber station 11 outside the wireless access network, the packet is transmitted to radio access stations (RAS) 12 and 13 through an access router (AR) 14, and the radio access stations 12 and 13 transmit the packet to the portable subscriber station 11.

The radio access station 12 and the access control router 13 may be formed in one apparatus or individually formed.

Figure 2:
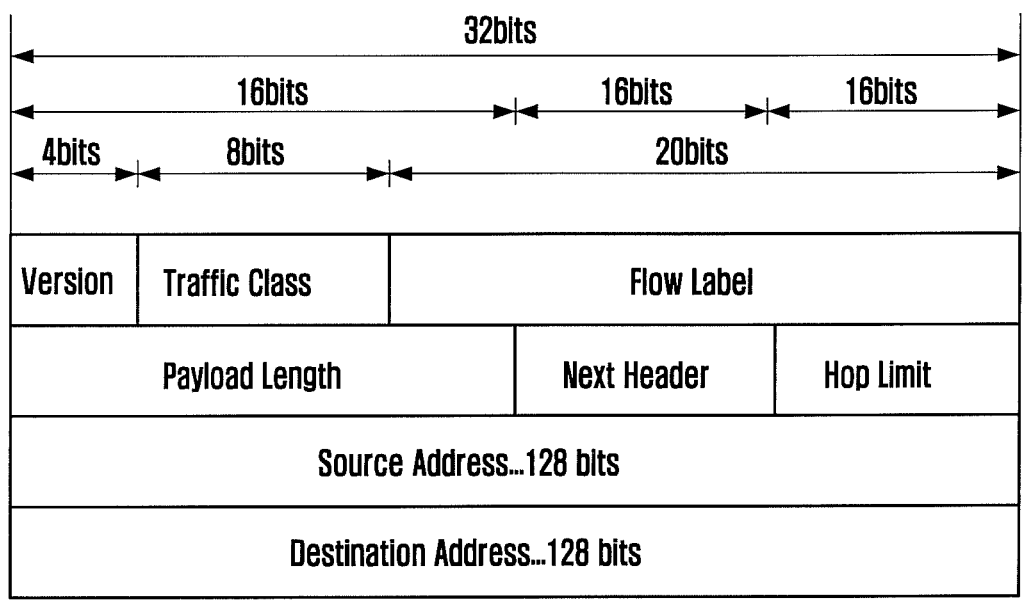
FIG. 2 shows an Internet Protocol version 6 (IPv6) packet header used in the present invention.

Referring to FIG. 2, a temporary address used in the present invention is used in a source address or destination address field in the IPv6 main header and has a length of 128 bits.

Figure 3:
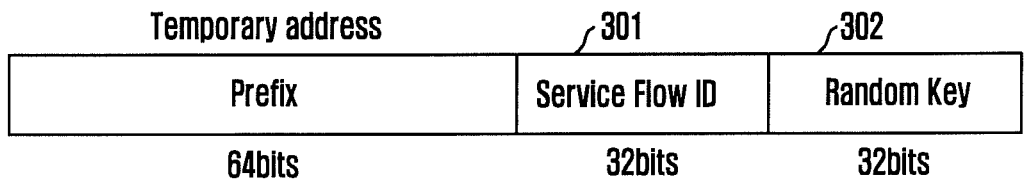
FIG. 3 shows a temporary address used in the present invention.

Referring to FIG. 3, the WiMAX/Mobile WiMAX IPv6 temporary address includes information on a prefix of 64 bits, a service flow ID 301 of 32 bits, and a random key 302 of 32 bits.

The service flow ID 301 is a value received from the access control router 13. Since the service flow ID 301 manages a mapping table on the service flow ID 301 and a connection identifier (CID) in the WiMAX/Mobile WiMAX system, a procedure of allocating radio resource is reduced by classifying traffic with the service flow ID 301 on the traffic. Herein, a classification method using a 5-tuple is not used. That is, the access control router 13 can easily allocate radio resource based on the CID mapped to the service flow ID 301 without an individual traffic classifying procedure.

The service flow ID 301 is a value that when the access control router 13 loads a WiMAX/Mobile WiMAX parameter, i.e., a temporary address allocation guidance parameter such as a W flag, in a router advertisement message (see FIG. 7) and transmits the router advertisement message to the portable subscriber station 11 such that the portable subscriber station 11 can generate an IPv6 temporary address, the portable subscriber station 11 receives from the access control router 13 through a Dynamic Host Configuration Protocol version 6 (DHCPv6) information request/reply message to generate an IPv6 temporary address based on the value.

The random key 302 is managed in the access control router 13 or the radio access station RAS 12, and is a value for checking whether the IPv6 address is a WiMAX/Mobile WiMAX IPv6 temporary address to which the service flow ID 301 is allocated, i.e., a temporary address check information.

The random key 302 is a random number value which is generated to generate the IPv6 temporary address in the portable subscriber station 11. The random key 302 is a value which is transmitted to the radio access station 12 or the access control router 13 through a neighbor solicitation (NS) message transmitted to perform duplicated address detection (DAD) for detecting whether the IPv6 temporary address generated in the portable subscriber station 11 is used by another host in a network managed by a router, and which is mapped to the service flow ID 301 and managed. The access control router 13 or the radio access station 12 determines whether a destination address of the traffic received based on the value is a temporary address generated in the portable subscriber station 11.

Therefore, the service flow ID 301, the random key 302, and the connection identifier for allocating radio resource are mapped to a mapping table and managed in the access control router 13 or the radio access station 12.

In consideration of a procedure of generating an IPv6 temporary address of the portable subscriber station 11 (see FIG. 4) and a procedure of allocating a temporary address in a network (see FIG. 5), a procedure of transmitting the service flow ID 301 to the portable subscriber station 11 based on the DHCPv6 Information-request/reply message in the network to generate or allocate the IPv6 temporary address in the generating and allocating procedures will be described with reference to FIG. 5. Finally, a procedure of classifying traffic based on the generated IPv6 temporary address and allocating radio resource will be described with reference to FIG. 6.

Figure 4:
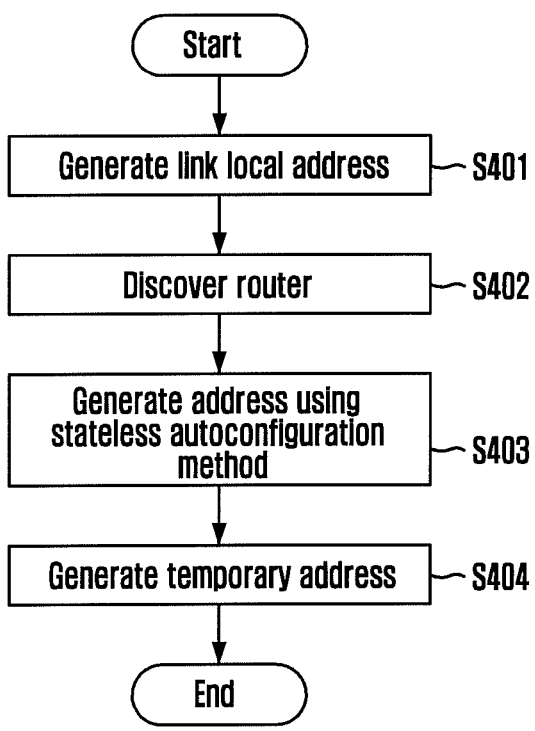
FIG. 4 is a flowchart describing a temporary address generating method in the portable subscriber station in accordance with an embodiment of the present invention.

FIG. 4 is a flowchart describing a temporary address generating method in the portable subscriber station in accordance with an embodiment of the present invention and shows a procedure that the portable subscriber station 11 generates an IPv6 temporary address.

At step S401, the portable subscriber station 11 generates a link local address based on own interface ID in WiMAX/Mobile WiMAX access.

The portable subscriber station 11 receives a required parameter from the router, i.e., the radio access station 12 or the access control router 13, through a router discovery procedure of step S402.

At step S403, when the portable subscriber station 11 operates in a stateless autoconfiguration method, the portable subscriber station 11 can generate a global address based on a prefix value included in the router advertisement message, which is transmitted from the access control router 13 or the radio access station 12.

Figure 7:
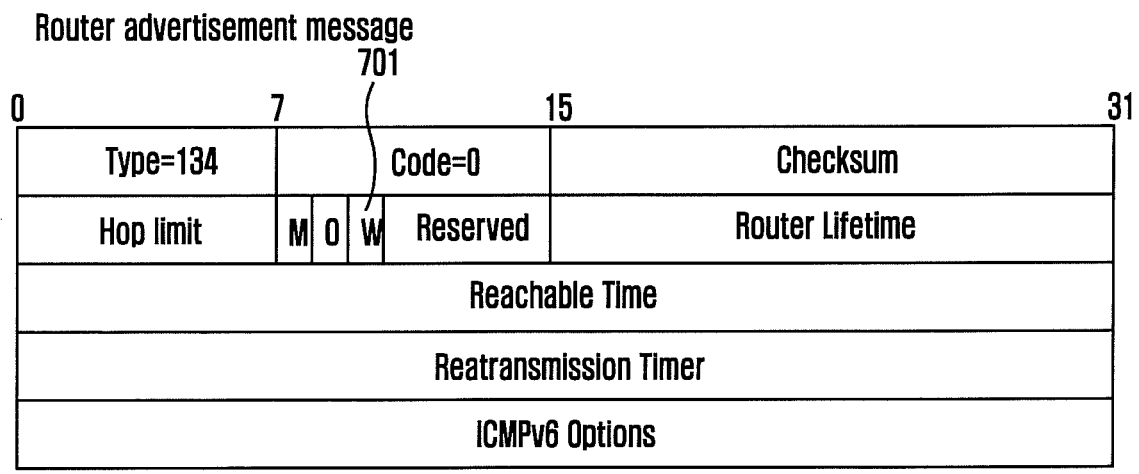
FIG. 7 shows a router advertisement message for allocating a temporary address in accordance with an embodiment of the present invention.

In accordance with the present invention, the router advertisement message includes a WiMAX/Mobile WiMAX parameter, which is temporary address allocation guidance parameter such as a 'W flag' for guiding that the portable subscriber station 11 allocates the IPv6 temporary address (see FIG. 7). When the portable subscriber station 11 receives the router advertisement message including the WiMAX/Mobile WiMAX parameter, the portable subscriber station 11 generates a WiMAX/Mobile WiMAX IPv6 temporary address based on the service flow ID 301 transmitted from the access control router 13 through the DHCPv6 information request/reply message at step S404.

The random key 302 beside the prefix information and the service flow ID 301 loaded in the router advertisement message is used in generating an IPv6 temporary address. The random key 302 generated for generating an IPv6 temporary address in the portable subscriber station 11 is transmitted to the radio access station 12 or the access control router 13 through a neighbor solicitation (NS) message and is applied as temporary address check information in traffic classification for allocating radio resource later, i.e., information for checking whether a traffic destination address is a WiMAX/Mobile WiMAX IPv6 temporary address to which the service flow ID is allocated.

As additional information, the stateless autoconfiguration method is an autoconfiguration method of the host used in the IPv6. The stateless autoconfiguration method is a method for automatically receiving an IP address by connecting a network without a server such as DHCP. There are a link local address and a global address as an address that the IPv6 portable subscriber station uses.

The link local address is an address used in a single network and is applied for the purpose of management and internal communication. Meanwhile, the global address is used for data communication with an external IPv6 network. The link local address and the global address are generated by IP autoconfiguration.

Figure 5:
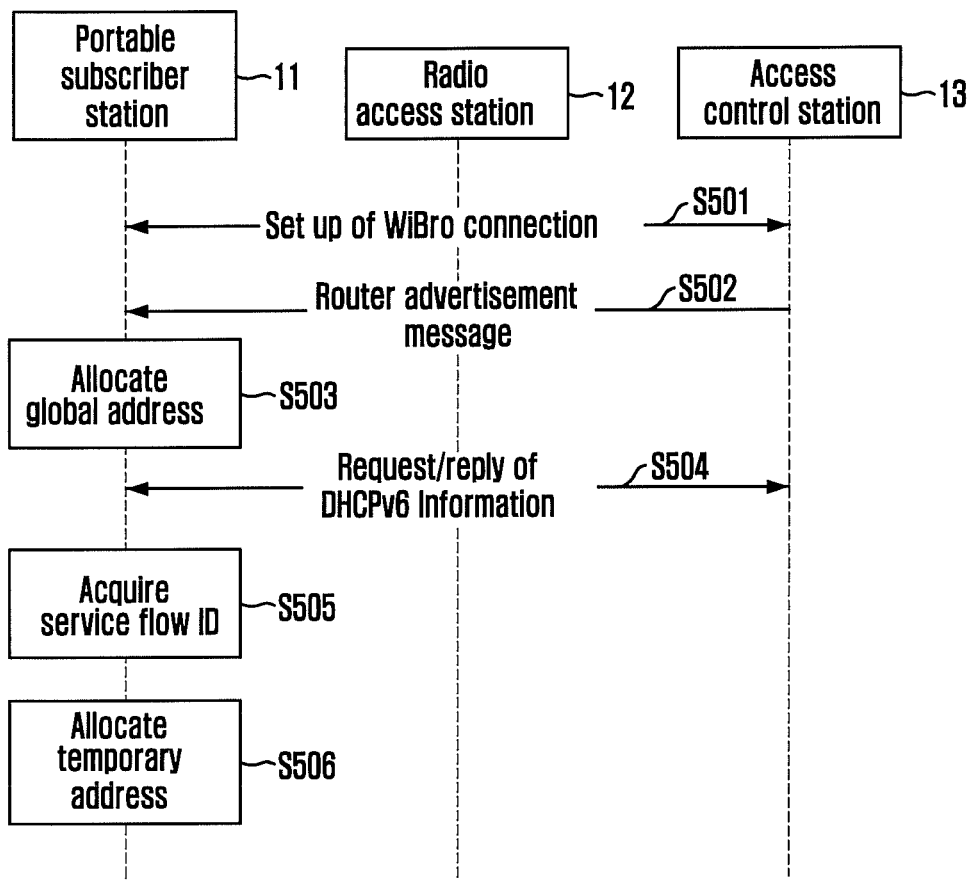
FIG. 5 is a flowchart describing a temporary address allocating method in a network in accordance with an embodiment of the present invention.

FIG. 5 is a flowchart describing a temporary address allocating method in a network in accordance with an embodiment of the present invention and shows a procedure of allocating the WiMAX/Mobile WiMAX IPv6 temporary address of FIG. 3 to the portable subscriber station 11 in the access control router 13.

In setting up WiMAX/Mobile WiMAX connection at step S501, when the access control router 13 or the radio access station 12 transmits a router advertisement message as shown in FIG. 7 at step S502, the portable subscriber station 11 generates a global address at step S503. When the WiMAX/Mobile WiMAX parameter, i.e., the temporary address allocation guidance parameter such as a W flag, is included in the router advertisement message, the portable subscriber station 11 can acquire a value of the service flow ID 301 at step S505 from the access control router 13 based on the DHCPv6 Information request/reply message of DHCPv6 at step S504.

The portable subscriber station 11 generates a WiMAX/Mobile WiMAX IPv6 temporary address based on the received service flow ID 301, the prefix information loaded in the router advertisement message, and the generated random key 302 information at step S506.

A value transmitted through the router advertisement message is used as the prefix. The service flow ID 301 and the random key 302 value of FIG. 3 instead of a predetermined value is used as the interface ID.

The portable subscriber station 11 transmits the random key 302 information to the radio access station 12 or the access control router 13 through the neighbor solicitation message.

Referring to FIG. 7, the router advertisement message uses Internet Control Message Protocol (ICMP) of IPv6.

An 8-bit "Type" value 134 of ICMP denotes the router advertisement message.

A 8-bit "code" value of the router advertisement message is set up as '0' and a node receiving the router advertisement message does not use the value.

A 16-bit "checksum" value is used to check whether an error is generated in the middle of message transmission.

Also, a 8-bit "Hop Limit" value is a value for limiting the number of subnets that the router advertisement message can pass through to arrive at a final destination. The Hop limit decreases one by one whenever the subnet is changed.

A 1-bit M flag is 'Managed Address configuration'. When the value is 1, an address is automatically set up through the DHCP server. When the value is 0, an address is automatically set up without going through the DHCP server.

A 1-bit O flag is 'Other stateful configuration'. When the value is 1 and an address is automatically set up through the DHCP server, information except the address is acquired. The information except the address includes an address of a site that the portable subscriber station 11 initially accesses after setting up the address, an address of a default router, and a domain name server (DNS) address.

Also, 5-bit "Reserve" is reserved to be used for another usage later.

16-bit "Router Lifetime" denotes an effective time of a default router on the basis of second unit and denotes that 0 is not a default router.

32-bit "Reachable Time" denotes a time for arriving at a node after receiving a message on the basis of a millisecond unit and 0 means that an arrival time cannot be acquired.

32-bit "Retransmission Timer" expresses a transmission period of the advertisement message as a millisecond unit. 0 means that a transmission period is not regulated.

128-bit "Source Link Layer Address" is an IPv6 address for transmitting the advertisement message. 32-bit "MTU Maximum Transmission Unit" denotes a transmission data length of a link layer according to a characteristic of a subnet for transmitting the advertisement message. Also, 128-bit "Prefix Information" is prefix information used for address autoconfiguration.

In particular, the present invention adds a field of "W flag" 701 in a general router advertisement message such that the portable subscriber station 11 can receive the service flow ID 301 in the access control router 13. In accordance with the present invention, when the value of the W flag 701 in the router advertisement message is 1, the portable subscriber station 11 transmits the DHCPv6 information request/reply message to the access control router and acquires the value of the service flow ID 301.

Finally, a procedure of allocating radio resource will be described in detail.

Figure 6:
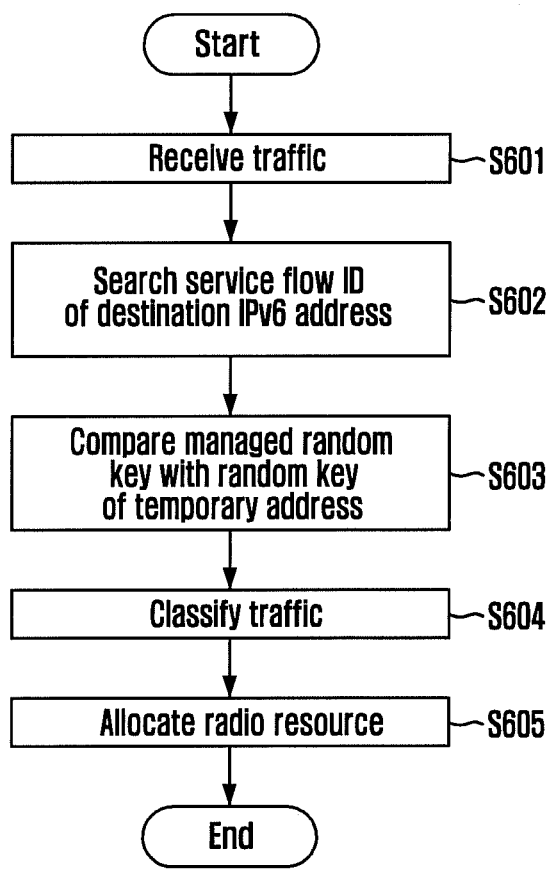
FIG. 6 is a flowchart describing a radio resource allocating method in accordance with an embodiment of the present invention.

FIG. 6 is a flowchart describing a radio resource allocating method in accordance with an embodiment of the present invention and shows a procedure of classifying traffic and allocating radio resource based on the WiMAX/Mobile WiMAX IPv6 temporary address generated in FIG. 3.

At steps S601 and S602, the access control router 13 searches the service flow ID 301 in destination addresses of the received traffic.

It is checked at step S603 whether the IPv6 temporary address destination address is the WiMAX/Mobile WiMAX IPv6 temporary address to which the service flow ID is allocated by comparing a random key corresponding to the service flow ID 301, i.e., a managed random key, and the random key 302 of the temporary address in a mapping table. As described above, the access control router 13 and the radio access station 12 manages the service flow ID 301, the random key 302, and connection identifier for allocating radio resource by mapping them to the mapping table.

At the check result, when the managed random key and the random key of the IPv6 temporary address are identical, the received traffic are classified by the service flow ID 301 inside the destination address at step S604. The received traffic is transmitted to the radio access station 12 in which the portable subscriber station 11 is included based on the connection identifier mapped to the service flow ID.

At step S605, the radio resource are allocated in the radio access station 12 based on the connection identifier mapped to the service flow ID through the service flow ID inside the destination address. That is, the radio access station 12 does not need to classify the IPv6 traffic to allocate radio resource. The radio access station 12 reads the service flow ID 301 inside the IPv6 temporary address, allocates the radio resource based on the predetermined connection identifier and transmits the radio resource to the portable subscriber station 11.

Since a classifying method using 5-tuple is not used in the above traffic classifying procedure, a search speed is high and realization is simple.

It is assumed that the IPv6 temporary address is used in a downlink traffic classifying procedure of the access control router 13 and the radio access station 12. However, the IPv6temporary address may be used in an uplink traffic classifying procedure of the radio access station 12 and the access control router 13 in case that the traffic is transmitted from the portable subscriber station 11 through a network. The radio access station 12 and the access control router 13 do not need to classify the IPv6 traffic to allocate the radio resource. The radio access station 12 and the access control router 13 read the service flow ID of the IPv6 temporary address, allocate the radio resource based on the predetermined connection identifier, and transmit the radio resource to the server, e.g., a broadcasting server.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

What is claimed is:

1. A method for generating a temporary address in a wireless broadband access network, comprising the steps of:
   receiving a router advertisement message in a portable subscriber station;
   acquiring a service flow identification (ID) based on a temporary address allocation guidance parameter of the router advertisement message in the portable subscriber station; and
   generating a WiMAX/Mobile WiMAX temporary address based on the service flow ID in the portable subscriber station; and transmitting a random key used in generating the WiMAX/Mobile WiMAX temporary address from the portable subscriber station to a radio access station (RAS) through a neighbor solicitation (NS) message.

2. The method of claim 1, wherein the WiMAX/Mobile WiMAX temporary address allocation guidance parameter is loaded in a W flag, which is a flag of the router advertisement message, and guides acquisition of the service flow ID from the radio access station through a Dynamic Host Configuration Protocol (DHCP) information request/reply message.

3. The method of claim 1, wherein the random key is a temporary address check information for checking whether a traffic destination address of the radio access station is a WiMAX/Mobile WiMAX temporary address to which the service flow ID is allocated.

4. The method of claim 1, wherein the WiMAX/Mobile WiMAX temporary address includes 64-bit prefix information transmitted through the router advertisement message, and a 32-bit random key and 32-bit service flow ID.

5. The method of claim 1, wherein the WiMAX/Mobile WiMAX temporary address is an Internet Protocol version 6 (IPv6) temporary address.

6. The method of claim 5, wherein the radio access station receives the random key from the portable subscriber station, manages the random key by mapping the random key to the service flow ID, compares the managed random key with a random key loaded in a received traffic destination address upon receiving an uplink/downlink traffic, and checks whether the received traffic destination address is the generated IPv6 temporary address.

7. The method of claim 6, wherein when the received traffic destination address is the generated IPv6 temporary address, the radio access station classifies the uplink/downlink traffic received by the service flow ID of the destination address and allocates the radio resource.

8. A method for allocating a temporary address in a wireless broadband access network, comprising the steps of:
   inserting a temporary address allocation guidance parameter to a router advertisement message and transmitting the router advertisement message to a portable subscriber station in a radio access station (RAS); and
   transmitting a service flow identification (ID) to the portable subscriber station in the radio access station upon request of the portable subscriber station based on the temporary address allocation guidance parameter and generating a WiMAX/Mobile WiMAX temporary address based on the service flow ID in the portable subscriber station; and
   when the portable subscriber station transmits a random key used in generating the WiMAX/Mobile WiMAX temporary address to the radio access station through a neighbor solicitation (NS) message, managing the random key transmitted from the portable subscriber station by mapping the random key to the service flow ID in the radio access station.

9. The method of claim 8, wherein the temporary address allocation guidance parameter is loaded in a W flag, which is a flag of the router advertisement message, and guides acquisition of the service flow ID from the radio access station through a Dynamic Host Configuration Protocol (DHCP) information request/reply message.

10. The method of claim 8, wherein the random key is a temporary address check information for checking whether a traffic destination address of the radio access station is the WiMAX/Mobile WiMAX temporary address to which the service flow ID is allocated.

11. The method of claim 8, wherein the WiMAX/Mobile WiMAX temporary address includes 64-bit prefix information transmitted through the router advertisement message, and a 32-bit random key and a 32-bit service flow ID.

12. The method of claim 8, wherein the WiMAX/Mobile WiMAX temporary address is an Internet Protocol version 6 (IPv6) temporary address.

13. The method of claim 12, further comprising the steps of:
   comparing the managed random key with a random key loaded in a received traffic destination address upon receiving an uplink/downlink traffic in the radio access station, and checking whether the received traffic destination address is the generated IPv6 temporary address; and
   when the received traffic destination address is the generated IPv6 temporary address, classifying the received uplink/downlink traffic based on the service flow ID of the destination address and allocating radio resource in the radio access station.

* * * * *